(12) United States Patent
Toler et al.

(10) Patent No.: US 11,093,028 B2
(45) Date of Patent: Aug. 17, 2021

(54) TRAILER MOUNTED AIRCRAFT FUSELAGES WITH VIRTUAL ENVIRONMENT SYSTEMS

(71) Applicant: Gulfstream Aerospace Corporation, Savannah, GA (US)

(72) Inventors: Brian Toler, Savannah, GA (US); Drew Holbrook, Savannah, GA (US); Larry Patterson, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 329 days.

(21) Appl. No.: 16/020,779

(22) Filed: Jun. 27, 2018

(65) Prior Publication Data

US 2020/0004325 A1 Jan. 2, 2020

(51) Int. Cl.
*G06F 3/01* (2006.01)
*G09B 9/00* (2006.01)
*G09B 19/00* (2006.01)

(52) U.S. Cl.
CPC .............. *G06F 3/012* (2013.01); *G06F 3/017* (2013.01); *G09B 9/00* (2013.01); *G09B 19/0069* (2013.01)

(58) Field of Classification Search
CPC ........... G06F 3/012; G06F 3/017; G09B 9/00; G09B 19/0069; G09B 9/042; G09B 19/00
See application file for complete search history.

(56) References Cited

U.S. PATENT DOCUMENTS

| 5,009,598 | A | 4/1991 | Bennington |
| 5,162,828 | A | 11/1992 | Beach et al. |
| 5,316,480 | A * | 5/1994 | Ellsworth ............... A63G 31/16 434/29 |
| 5,616,030 | A | 4/1997 | Watson |
| 6,012,926 | A | 1/2000 | Hodges et al. |
| 9,202,385 | B2 | 12/2015 | Pabst et al. |
| 9,995,936 | B1 | 6/2018 | Macannuco et al. |
| 2009/0042173 | A1 | 2/2009 | Jaszlics |
| 2011/0076648 | A1 | 3/2011 | Lindheim et al. |
| 2015/0260474 | A1 | 9/2015 | Rublowsky et al. |

FOREIGN PATENT DOCUMENTS

WO 20150059671 A1 4/2015

* cited by examiner

*Primary Examiner* — Jerry-Daryl Fletcher
(74) *Attorney, Agent, or Firm* — LKGlobal | Lorenz & Kopf, LLP

(57) ABSTRACT

A system for virtually experiencing an aircraft includes a trailer, an aircraft fuselage, a cabin module, a head mounted display, and a controller. The aircraft fuselage is disposed in the trailer and defines an interior with a first portion and a second portion. The first portion is substantially unfurnished. The cabin module is disposed in the second portion and includes furnishings. The head mounted display is configured for movement within the interior. The controller is configured for generating a virtual aircraft interior based on a position and an orientation of the head mounted display relative to the interior of the aircraft fuselage and for controlling the head mounted display to display the virtual aircraft interior.

20 Claims, 4 Drawing Sheets

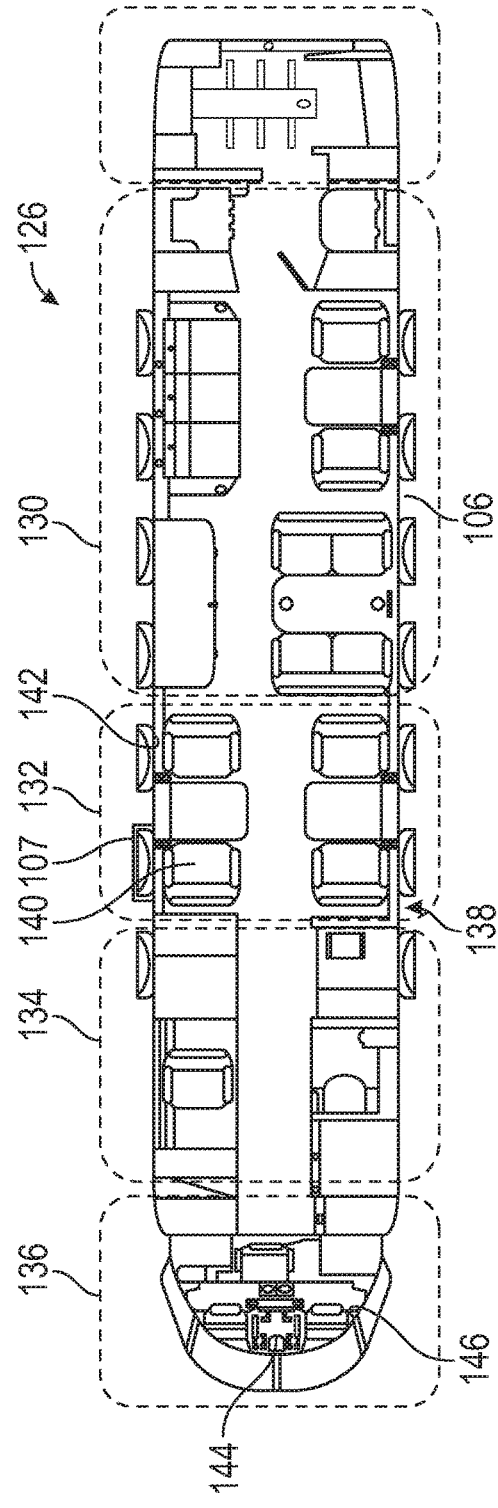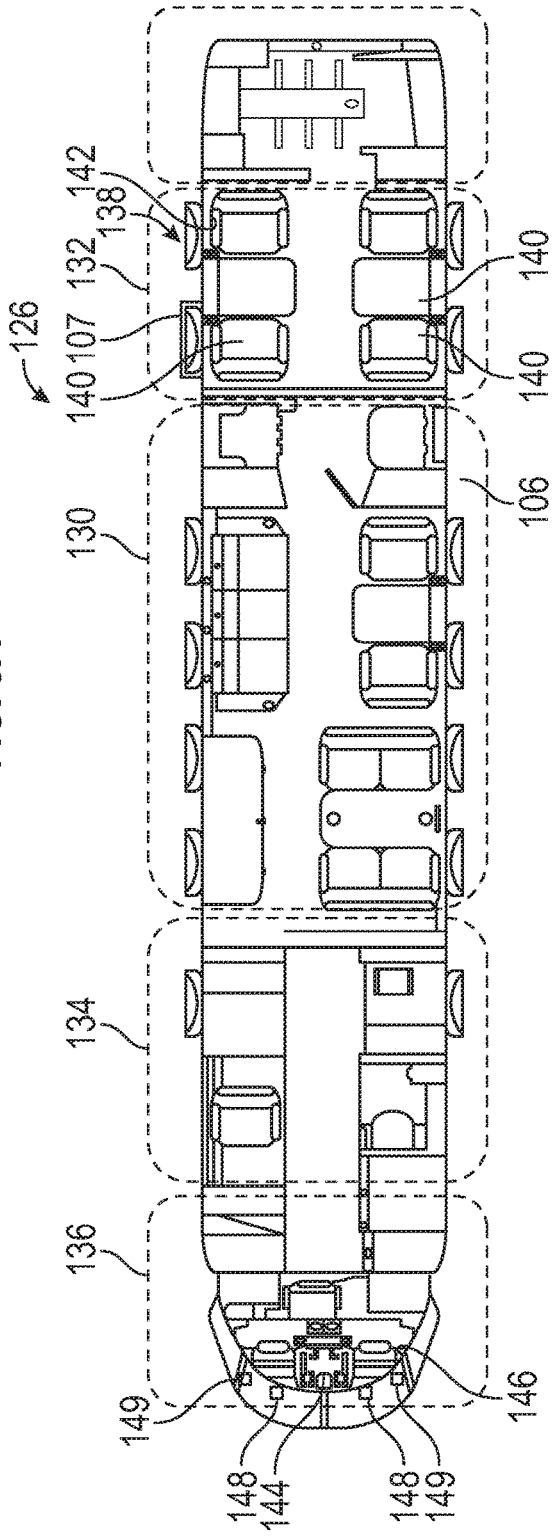

TRAILER MOUNTED AIRCRAFT FUSELAGES WITH VIRTUAL ENVIRONMENT SYSTEMS

TECHNICAL FIELD

Embodiments of the present invention generally relate to systems for virtual presentation of aircraft interiors, and more particularly relate to systems with fuselages disposed in trailers and with head mounted devices for presenting virtual aircraft interiors within the fuselages.

BACKGROUND OF THE INVENTION

Sales, marketing, and training related to aircraft typically utilize a completed aircraft or a physical "mock up" of a completed portion of the aircraft. These completed aircraft and physical mock ups are typically expensive and are typically configured with only one layout or purpose. Although these completed aircraft and physical mock ups are suitable for their intended purposes, there is always room for improvement.

As such, it is desirable to provide systems for sales, marketing, and training related to aircraft. In addition, other desirable features and characteristics will become apparent from the subsequent summary and detailed description, and the appended claims, taken in conjunction with the accompanying drawings and this background.

SUMMARY

Various non-limiting embodiments of systems for virtually experiencing an aircraft are disclosed herein.

In a first non-limiting embodiment, a system for virtually experiencing an aircraft includes, but is not limited to, a trailer, a portion of an aircraft fuselage, a cabin module, a head mounted display, and a controller. The portion of the aircraft fuselage is disposed in the trailer and defines an interior with a first portion and a second portion. The first portion is substantially unfurnished. The cabin module is disposed in the second portion and includes furnishings. The head mounted display is configured for movement within the interior. The controller is communicatively coupled with the head mounted display and is configured for generating a virtual aircraft interior based on a position and an orientation of the head mounted display relative to the interior of the aircraft fuselage and for controlling the head mounted display to display the virtual aircraft interior.

In a second non-limiting embodiment, a system for virtually experiencing an aircraft includes, but is not limited to, a trailer, an aircraft fuselage, a cabin module, a head mounted display, a user interaction sensor, and a controller. The aircraft fuselage is disposed in the trailer and defines an interior with a first portion and a second portion. The first portion is substantially unfurnished. The cabin module is disposed in the second portion and includes aircraft cabin furnishings with an aircraft cabin chair, an aircraft cabin table, and an aircraft cabin side ledge. The head mounted display is configured for movement within the interior. The user interaction sensor is configured to receive user inputs from a user of the head mounted display. The controller is communicatively coupled with the head mounted display and with the user interaction sensor. The controller is configured for generating a virtual aircraft interior based on a position and an orientation of the head mounted display relative to the interior of the aircraft fuselage and based on cabin finishing selections.

DESCRIPTION OF THE DRAWINGS

Advantages of the present embodiments will be readily appreciated as the embodiments becomes better understood by reference to the following detailed description, when considered in connection with the accompanying drawings wherein:

FIGS. 3A and 3B are simplified top views illustrating an interior and a virtual interior of the system of FIG. 1;

DESCRIPTION OF EXEMPLARY EMBODIMENTS

The following detailed description is merely exemplary in nature and is not intended to limit the invention or the application and uses of the invention. Furthermore, there is no intention to be bound by any theory presented in the preceding background or the following detailed description.

The embodiments provided herein generally provide a mobile immersive experience for training, sales, and marketing of aircraft. The customers experience virtual, augmented, and projection realities during trade shows, at customer facilities, or at any other suitable location. The customers may include pilots, potential aircraft purchasers, flight attendants, maintenance personnel, or other interested people, and are herein called "users" of the system. In some embodiments, users are able to interact with a virtual aircraft by flying the virtual aircraft, changing cabin layouts, performing maintenance reviews, changing finishing materials and colors, and performing other customization and familiarization interactions. In some embodiments, mixed reality applications are utilized through the use of augmented, virtual, and projected realities by blending computer generated graphics with physical objects, such as a physical cabin seat.

In some embodiments, users enter a "cabin" that is empty with the exception of the cockpit and one living space. The cockpit has a flight deck with throttle control, flight controls, and rudder pedals. In some embodiments, the one living space with four seats is the only physical seating in the cabin, and the rest of the cabin is populated by the virtual environment on a head mounted display.

Figure 1:
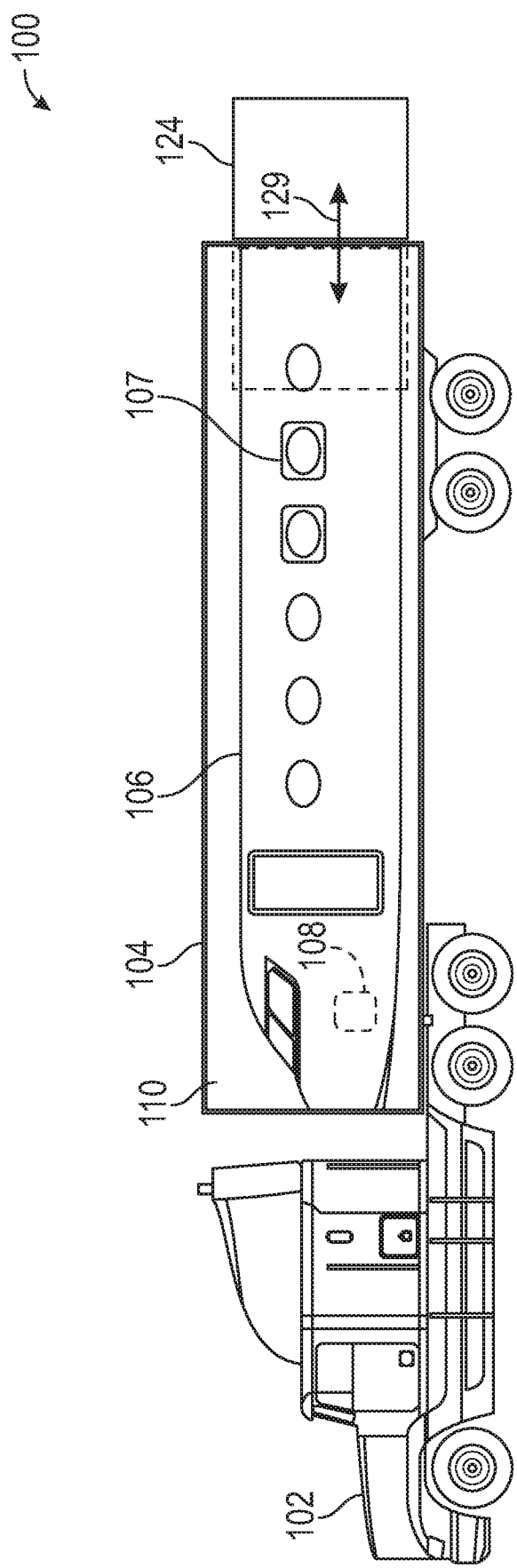
FIG. 1 is a simplified diagram illustrating a non-limiting embodiment of a system for virtually experiencing an aircraft in accordance with the teachings of the present disclosure.

FIG. 1 illustrates a non-limiting embodiment of a system 100 for virtually experiencing an aircraft. System 100 includes a tractor 102, a trailer 104, a portion of a fuselage 106 (referred to hereinafter as "fuselage 106" for the sake of brevity), a window display 107, and a virtual experience system 108. Tractor 102 may be any vehicle configured to tow trailer 104.

Trailer 104 may be any trailer suitable for hauling fuselage 106. For example, trailer 104 may be similar to trailers utilized for race car hauling or freight hauling. In the example provided, trailer 104 provides cavities above and below fuselage 106 for housing computer servers, cooling equipment, hardware storage, and the like.

Figure 2A:
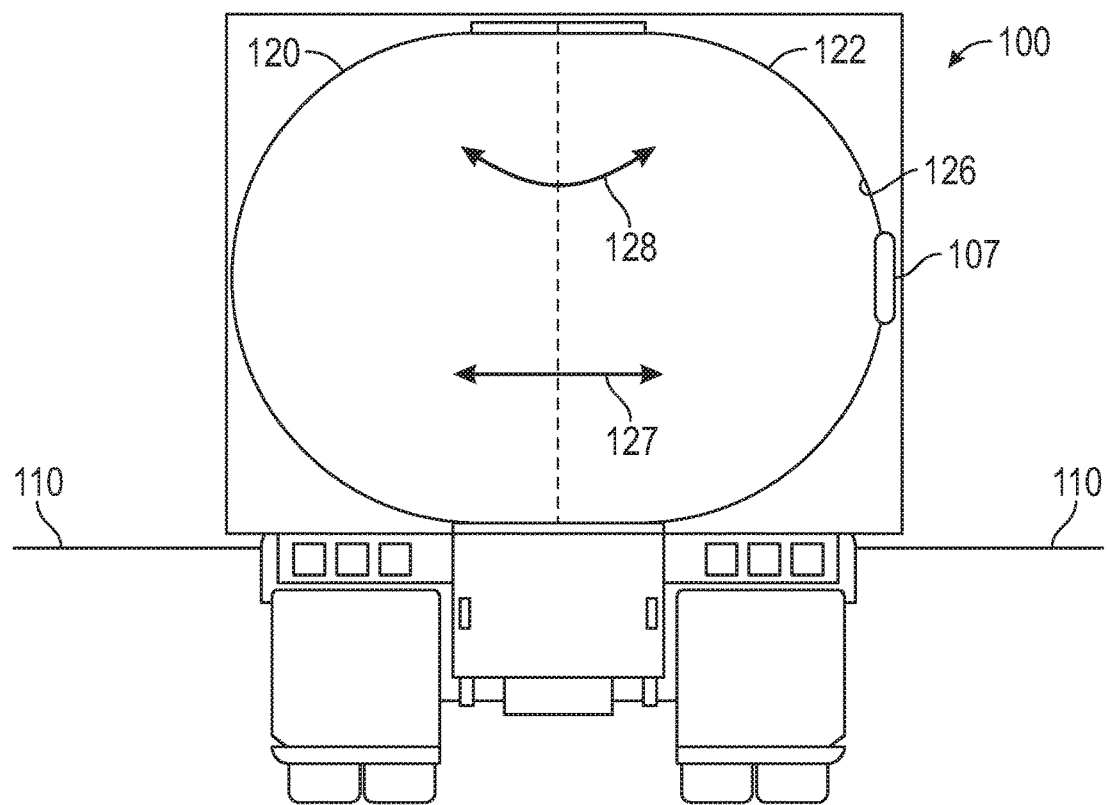
FIGS. 2A and 2B are simplified diagrams illustrating portions of the system of FIG. 1.
Figure 2B:
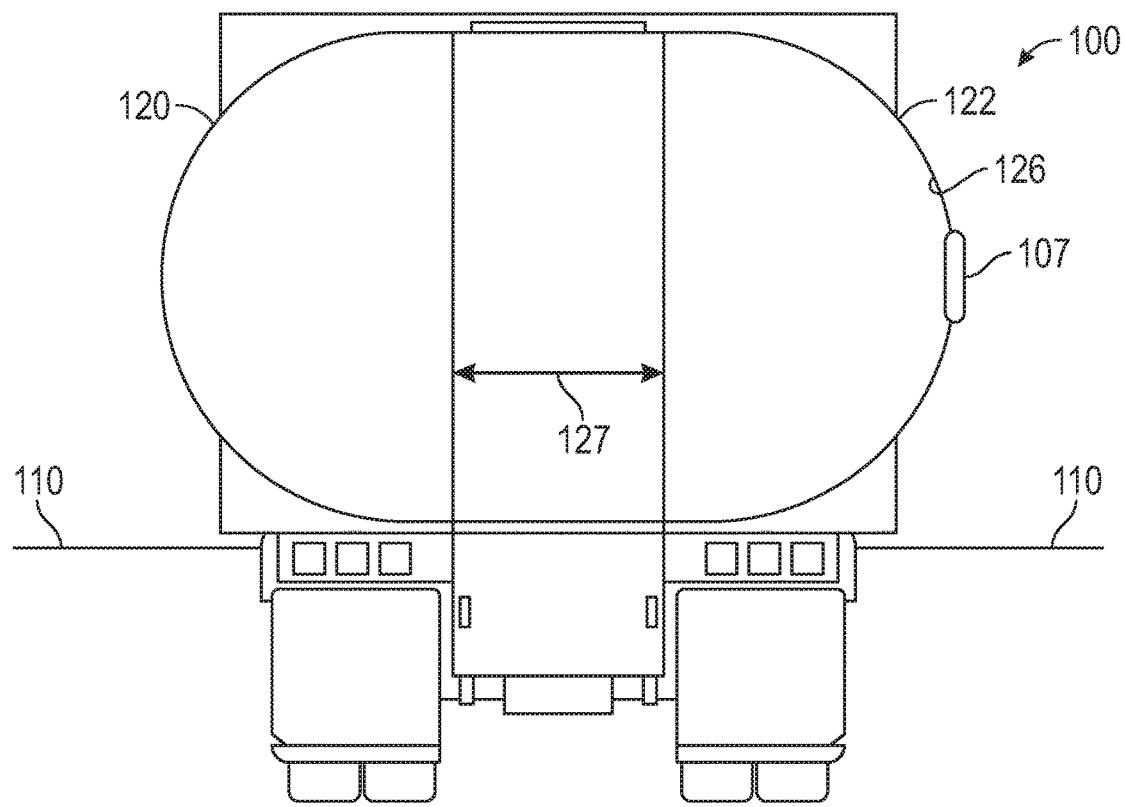
Figure 4:
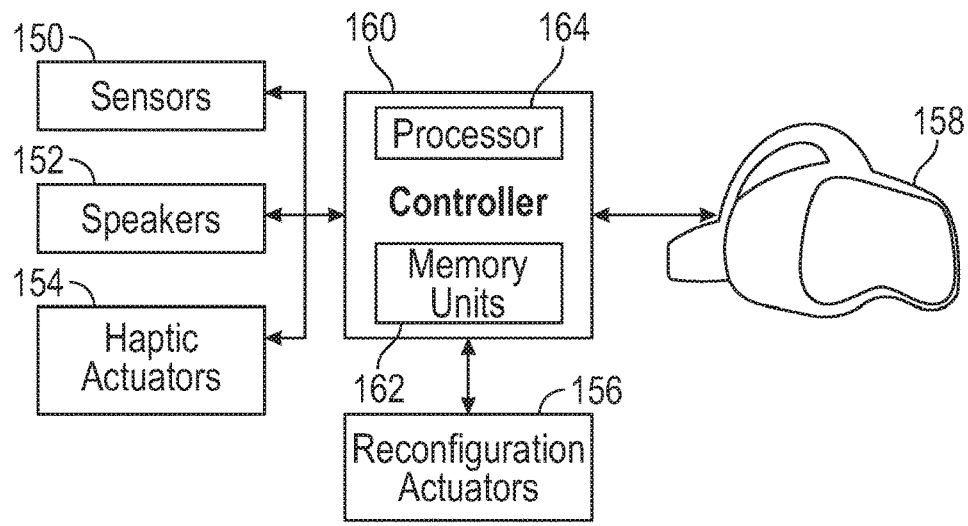
FIG. 4 is a simplified block diagram of a virtual experience system of the system of FIG. 1.

Referring now to FIGS. 2A and 2B, and with continued reference to FIG. 1, trailer 104 has a travel position illustrated in FIG. 1 and an expanded position illustrated in FIGS. 2A and 2B. In the travel position, trailer 104 has an exterior shape similar to the exterior shape of a conventional trailer, with substantially vertically oriented side walls 110. In the expanded position, side walls 110 rotate downward and outward to be horizontally oriented near a bottom of trailer 104. The expanded position permits enlargement of fuselage 106, as will be described below.

Fuselage 106 is disposed at least partially within trailer 104. Fuselage 106 has a left side 120, a right side 122, a longitudinal extension 124, and defines an interior 126. Fuselage 106 is configured to be extended and contracted between a contracted configuration shown in FIG. 2A and an extended configuration, shown in FIG. 2B. Fuselage 106 defines interior 126 to have a second width in the second position that is larger than a first width of interior 126 in the first position.

Left side 120 and right side 122 extend away from each other to move fuselage 106 from the first position to the second position. In the example provided, left side 120 and right side 122 laterally translate away from each other along path 127. For example, left side 120 and right side 122 may be disposed on rails to slide along side walls 110 to the second position. In some embodiments, left side 120 and right side 122 rotate up and away from each other along path 128 in addition to or instead of translating along path 127.

Longitudinal extension 124 is configured to extend into and out of a rear of trailer 104 along path 129. For example, longitudinal extension 124 may translate along rails to extend into and out of trailer 104. Longitudinal extension 124 may be used, for example, to virtually experience an aircraft whose fuselage 106 is longer than trailer 104. In some embodiments, longitudinal extension 124 is omitted.

Referring now to FIGS. 3A and 3B, and with continued reference to FIGS. 1 and 2A-B, interior 126 of fuselage 106 is illustrated in a top view. FIG. 3A is similar to FIG. 3B, but FIG. 3B has a cabin layout that is different from the cabin layout of FIG. 3A. Interior 126 has a first portion 130, a second portion 132, a third portion 134, a cockpit 136, and encloses a cabin module 138. Each of portions 130, 132, and 134 is associated with a section of a finished aircraft. The sections describe the function and furnishings to be located in a finished aircraft having the sections. As used herein, the term "layout" refers to the relative locations of portions 130, 132, and 134 within interior 126. The sections may be lavatories, conference rooms, bedrooms, kitchens, baggage compartments, theater areas, crew rests, row seating, general seating, or any other subdivision of interior 126 with a defined purpose.

Portions 130, 132, and 134 may include physical furnishings or may be unfurnished for association with a virtual interior with virtual furnishings, as will be described below. In the example provided, first portion 130 and third portion 134 are substantially unfurnished, but are illustrated with virtual furnishings as part of the virtual interior. In other words, the seats, tables, sofas, and other furniture items illustrated in portions 130 and 134 are not physically present in fuselage 106. In the example provided, fuselage 106 at portions 130 and 134 is a bare frame and aircraft skin. In some embodiments, fuselage 106 may include various components of electrical systems, hydraulic systems, heating/cooling systems, or other systems that are disposed behind walls of a finished aircraft.

Cabin module 138 is disposed in second portion 132 and includes aircraft cabin furnishings 140. Aircraft cabin furnishings 140 are physical furnishings that are substantially the same as furnishings to be installed and used in an operable aircraft. In the example provided, aircraft cabin furnishings 140 include an aircraft cabin chair, an aircraft cabin table, and an aircraft cabin side ledge. In some embodiments, aircraft cabin furnishings 140 and cabin module 138 are physical representations of a different section of the layout of interior 126. For example, cabin module 138 may be a lavatory or conference table section instead of a general seating section.

Cabin module 138 is configured to relocate within interior 126. For example, cabin module 138 may move from the position illustrated in FIG. 3A to the position illustrated in FIG. 3B to demonstrate a different configuration or cabin layout. The cabin layout may be set by virtual experience system 108, as will be described below. In the example provided, cabin module 138 relocates by sliding on tracks or rails (not illustrated) located on a floor of trailer 104 or fuselage 106.

In the example provided, fuselage 106 further includes finished interior closeouts 142 configured to secure to fuselage 106 at interior 126. Finished interior closeouts 142 are panels that approximate the finished wall or surface within a finished aircraft interior. Finished interior closeouts 142 may be secured to fuselage 106 with snap features, screws, hook and loop fasteners, or any other suitable feature to removably attach finished interior closeouts 142 to fuselage 106. Finished interior closeouts 142 may be used, for example, to demonstrate different colors and/or materials that may be configured with an aircraft purchase.

Cockpit 136 includes a center pedestal 144 and side ledges 146. Cockpit 136 is configured to receive a first set of flight input devices 148 and a second set of flight input devices 149. First set of flight input devices 148 is associated with a first flight deck of a first aircraft and second set of flight input devices 149 is associated with a second flight deck of a second aircraft. For example, first set of flight input devices 148 may include a yoke to be positioned directly in front of a crew member for receiving flight control inputs, and second set of flight input devices 149 may alternatively include a side stick located on side ledge 146 for receiving flight control inputs. By receiving separate sets of flight input devices, cockpit 136 may be made to simulate flight decks of different aircraft with different flight deck controls.

In the example provided, the sets of flight input devices are snap fit or magnetically secured in place to provide flight control inputs to virtual experience system 108. The flight input devices physically move in response to pilot interaction.

Window display 107 is a production aircraft window with a screen configured to simulate the view from the production aircraft window during flight. For example, virtual experience system 108 may cause window display 107 to present a pre-recorded view from an aircraft window during flight of the aircraft.

Virtual experience system 108 includes sensors 150, speakers 152, haptic actuators 154, reconfiguration actuators 156, a head mounted display 158, and a controller 160. In general, virtual experience system 108 is configured to demonstrate different features and configurations of commercially available aircraft for training, sales, and other purposes.

Sensors 150 include a user interaction sensor configured to receive user inputs from a user of head mounted display 158. The user interaction sensor may utilize any suitable technology to detect movement and gestures of the user. For example, the user interaction sensor may be an accelerometer, gyroscope, or compass associated with head mounted display 158. In some embodiments, sensors 150 include infrared sensors, optical sensors, RADAR sensors, capacitive sensors, and the like.

Speakers 152 are spread out within fuselage 106 to provide audio for occupants of fuselage 106. In the example provided, speakers 152 utilize conventional speaker technology and are evenly distributed throughout interior 126 of fuselage 106.

Haptic actuators 154 are vibration actuators coupled with floor panels, closeout panels, frame members, furnishings, and/or other components within fuselage 106. Haptic actuators 154 are utilized by controller 160 to simulate the vibrations experienced when flying in an operational aircraft.

Reconfiguration actuators 156 are coupled with longitudinal extension 124 and side walls 110 to assist with lowering side walls 110 and extending fuselage 106. Reconfiguration actuators 156 may include hydraulic actuators, electric motors, or other suitable technologies for moving components of fuselage 106. In some embodiments, reconfiguration actuators 156 are omitted and trailer 104 and fuselage 106 are manually reconfigured.

Head mounted display 158 is configured to secure to a head of a user to visually present images generated by controller 160. Head mounted display 158 may be a virtual reality device, an augmented reality device, a mixed reality device, or other suitable devices for presenting images generated by controller 160. In the example provided, head mounted display 158 is configured for free movement within interior 126 between portions 130, 132, 134, and cockpit 136. For example, head mounted display 158 may include a processor, a memory, and a wireless communication interface to permit electronic communication with other components of virtual experience system 108. In some embodiments, head mounted display 158 includes hardware and/or software components of controller 160. In some embodiments, head mounted display 158 is coupled to controller 160 by a wired data bus. In some embodiments, multiple head mounted displays 158 are utilized for concurrent use by multiple users.

Controller 160 is a hardware device that carries out instructions of a computer program, as is well known to those of ordinary skill in the art. Controller 160 is configured to execute the computer program to provide the functions described throughout the specification. Controller 160 includes one or more memory units 162 that store electronic data and computer programs. For example, memory units 162 may be flash memory, spin-transfer torque random access memory (STT-RAM), magnetic memory, phase-change memory (PCM), dynamic random access memory (DRAM), or other suitable electronic storage media. In the example provided, memory units 162 store control logic with instructions that cooperate with processor 164 to perform tasks of the method described below. In some embodiments, processor 164 may include one or more central processing units ("CPUs"), a microprocessor, an application specific integrated circuit ("ASIC"), a microcontroller, and/or other suitable device. Furthermore, controller 160 may utilize multiple grouped and/or separately located hardware devices communicating across a wired or wireless data bus. In the example provided, controller 160 includes computer servers and processing components in head mounted display 158.

Figure 5:
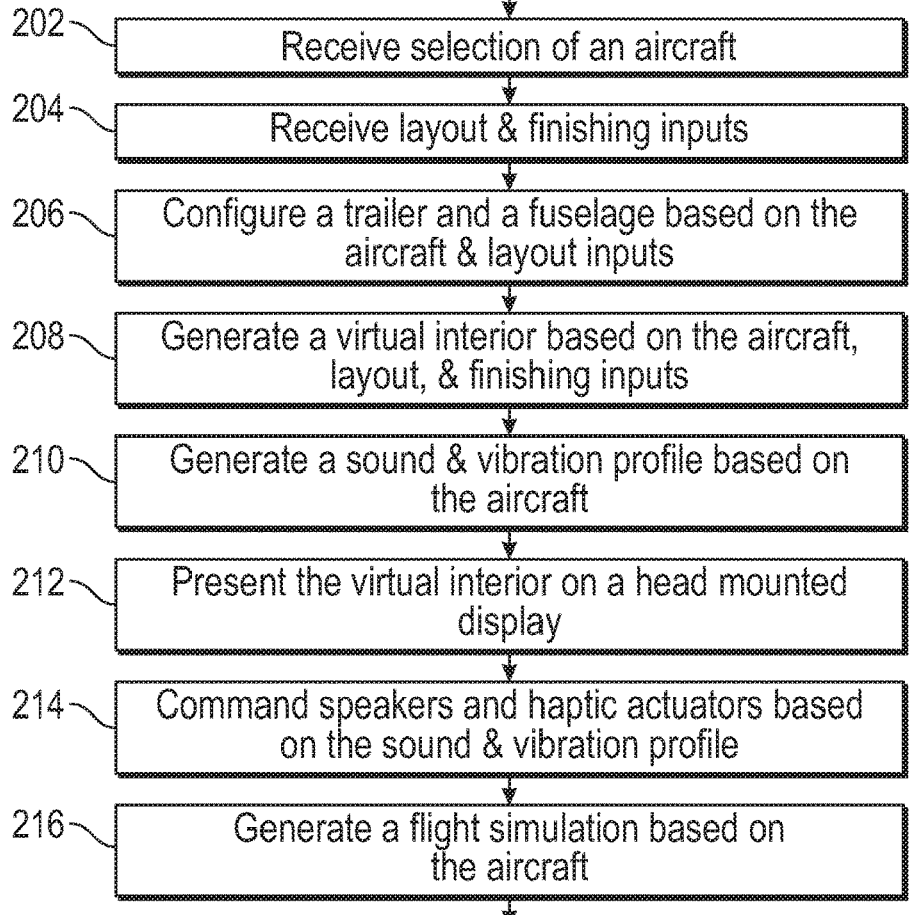
FIG. 5 is a flow diagram illustrating a non-limiting embodiment of a method for operating the system of FIG. 1 in accordance with the teachings of the present disclosure.

Referring now to FIG. 5, and with continued reference to FIGS. 1, 2A-B, 3A-B, and 4, a flow diagram for a method 200 of using system 100 is illustrated. In the example provided, tasks of method 200 are performed by controller 160.

Task 202 receives a selection of an aircraft. For example, several different aircraft models having different sized fuselages, flight capabilities, interior noises, and vibrations during operation may be loaded into controller 160 and selected by an operator or user of system 100. Each of the different aircraft models is an aircraft that may be presented for sales or training purposes to the user. In the example provided, the different aircraft models include a large cabin business jet and a small cabin business jet.

Task 204 receives layout and finishing inputs. For example, the layout inputs may be entered by the user or the operator to indicate whether interior 126 should have the arrangement and relative positions of portions 130, 132, 134 illustrated in FIG. 3A or the arrangement and relative positions illustrated in FIG. 3B. Similarly, the finishing inputs may indicate the color and type of flooring, trim, seat coverings, and other finishing details.

Task 206 configures a trailer and a fuselage based on the selected aircraft and layout inputs. For example, controller 160 may command reconfiguration actuators 156 to lower side walls 110, extend longitudinal extension 124, move left side 120 and right side 122 between the first position and the second position, and move cabin module 138 to the desired position to configure trailer 104 and fuselage 106.

Task 208 generates a virtual interior based on the selected aircraft, the layout inputs, and the finishing inputs. For example, controller 160 may generate the virtual interior as a virtual reality interior, an augmented reality interior, or a mixed reality interior for display on head mounted display 158. In the example provided, controller 160 is configured for generating the virtual aircraft interior based on a position and an orientation of head mounted display 158 relative to interior 126 of fuselage 106. For example, when a user looks at an interior closeout 142 while wearing head mounted display 158, controller 160 may generate an image of the selected trim and color options where interior closeout 142 is located. By generating the virtual aircraft interior based on the position and orientation of head mounted display 158, a user of system 100 may physically touch interior closeout 142 while being visually presented with the selected color and trim type.

By loading the virtual interior based on the selected aircraft, system 100 may be towed to conferences, training events, or other events to be used as a sales tool, training tool, or marketing tool. For example, potential customers may sit in a production aircraft seat and interact with aircraft model specific features through virtual and augmented applications. Flight attendants may train with and experience various galley, lavatory, and baggage compartment designs and interactions.

Controller 160 is further configured for generating the virtual aircraft interior based on interactions with movable components in the virtual aircraft interior indicated by user inputs. For example, sensors 150 may detect a motion that indicates the user is attempting to open a virtual door of the virtual interior. Controller 160 may then open the door in the virtual interior to simulate opening a physical door within fuselage 106.

In the example provided, controller 160 is further configured for generating the virtual aircraft interior based on a first transport category fuselage corresponding with the first width of interior 126 in the first position and based on a second transport category fuselage corresponding with the second width of interior 126 in the second position. For example, the user may select a large cabin business jet having the second width or may select a small cabin business jet having the first width.

In some embodiments, controller 160 is further configured for maintenance training based on the user inputs and for generating the virtual aircraft interior based on systems and components to be maintained within the fuselage. For example, the virtual aircraft interior may illustrate mechanical, electrical, and/or hydraulic systems where they are typically installed in the first or second transport category fuselage. Accordingly, maintenance technicians may be trained to maintain different aircraft by using system 100. For example, maintenance crews may receive virtual training while at trade shows or at their own facilities by virtually interacting with aircraft components to learn and investigate various designs.

Task 210 generates a sound and vibration profile based on the selected aircraft. For example, controller 160 may generate a first sound and vibration profile for haptic actuators 154 and speakers 152, where the first sound and vibration profile is configured for simulating sounds and vibrations of a first aircraft during operation. In the example provided, the first aircraft is a small cabin business jet and the sound and vibration profile permits the user to experience the sounds and vibrations encountered during operation of the first aircraft. Controller 160 may also be configured for generating a second sound and vibration profile for haptic actuators 154 and speakers 152, where the second sound and vibration profile is configured for simulating sounds and vibrations of a second aircraft during operation. In the example provided, the second aircraft is a large cabin business jet.

Task 212 presents the virtual interior on a head mounted display. For example, controller 160 may send a video signal to a screen of head mounted display 158.

Task 214 commands speakers and haptic actuators based on the sound and vibration profile. For example, controller 160 may send an audio signal to speakers 152 and a vibration intensity signal to haptic actuators 154.

Task 216 generates a flight simulation based on the selected aircraft. For example, controller 160 may be further configured for generating a first flight simulation based on input from first set of flight input devices 148 and for generating a second flight simulation based on input from second set of flight input devices 149. Accordingly, pilots may sit in a pilot seat from the selected aircraft with flight controls and throttles of the selected aircraft, while wearing a virtual headset to virtually fly an aircraft of their choice. The flight simulation permits experiencing multiple aircraft configurations, airports, and weather conditions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for virtually experiencing an aircraft, the system comprising:
   a trailer;
   a portion of an aircraft fuselage disposed in the trailer and defining an interior with a first portion and a second portion, wherein the first portion is unfurnished;
   a cabin module disposed in the second portion and including furnishings;
   a head mounted display configured for movement within the interior; and
   a controller communicatively coupled with the head mounted display and configured for:
      generating a virtual aircraft interior based on a position and an orientation of the head mounted display relative to the interior, and
      controlling the head mounted display to display the virtual aircraft interior.

2. The system of claim 1, wherein the furnishings include an aircraft cabin chair, an aircraft cabin table, and an aircraft cabin side ledge.

3. The system of claim 1, wherein the cabin module is configured to relocate within the interior and the controller is configured for generating the virtual aircraft interior further based on cabin layout selections.

4. The system of claim 1, wherein the controller is further configured for generating a finished cabin interior as the virtual interior further based on cabin finishing selections.

5. The system of claim 1, further comprising a user interaction sensor configured to receive user inputs from a user of the head mounted display.

6. The system of claim 5, wherein the controller is further configured for generating the virtual aircraft interior based on interactions with movable components in the virtual aircraft interior indicated by the user inputs.

7. The system of claim 5, wherein the controller is further configured for maintenance training based on the user inputs and for generating the virtual aircraft interior based on systems and components to be maintained within the aircraft fuselage.

8. The system of claim 1, further comprising finished interior closeouts configured to secure to the portion of the aircraft fuselage in the interior.

9. The system of claim 1, wherein the portion of the aircraft fuselage is configured to move between a first position and a second position, wherein a second width of the interior in the second position is larger than a first width of the interior in the first position.

10. The system of claim 9, wherein the controller is further configured for:
    generating the virtual aircraft interior based on a first transport category fuselage corresponding with the first width of the interior in the first position; and
    generating the virtual aircraft interior based on a second transport category fuselage corresponding with the second width of the interior in the second position, wherein the second width is larger than the first width.

11. The system of claim 10, wherein the portion of the aircraft fuselage includes a longitudinal extension configured to extend outside of a rear of the trailer.

12. The system of claim 1, wherein the portion of the aircraft fuselage further defines a cockpit including a center pedestal and side ledges, and wherein the cockpit is further configured to receive a first set of flight input devices associated with a first flight deck of a first aircraft and to receive a second set of flight input devices associated with a second flight deck of a second aircraft.

13. The system of claim 12, wherein the controller is further configured for generating a first flight simulation based on input from the first set of flight input devices and for generating a second flight simulation based on input from the second set of flight input devices.

14. The system of claim 1, further comprising haptic actuators and audio speakers operatively coupled with the controller, wherein the controller is further configured for generating a first sound and vibration profile for the haptic actuators and audio speakers, wherein the first sound and vibration profile is configured for simulating sounds and vibrations of a first aircraft during operation.

15. The system of claim 14, wherein the controller is configured for generating a second sound and vibration profile for the haptic actuators and audio speakers, wherein the second sound and vibration profile is configured for simulating sounds and vibrations of a second aircraft during operation.

16. The system of claim 1, further comprising a window display including a production aircraft window and a screen configured to simulate a view from the production aircraft window during flight.

17. A system for virtually experiencing an aircraft, the system comprising:
- a trailer;
- a portion of an aircraft fuselage disposed in the trailer and defining an interior with a first portion and a second portion, wherein the first portion is unfurnished;
- a cabin module disposed in the second portion and including furnishings with an aircraft cabin chair, an aircraft cabin table, and an aircraft cabin side ledge;
- a head mounted display configured for movement within the interior;
- a user interaction sensor configured to receive user inputs from a user of the head mounted display; and
- a controller communicatively coupled with the head mounted display and with the user interaction sensor, the controller configured for:
  - generating a virtual aircraft interior based on a position and an orientation of the head mounted display relative to the interior and based on cabin finishing selections, and
  - controlling the head mounted display to display the virtual aircraft interior.

18. The system of claim 17, wherein the cabin module is configured to relocate within the interior and the controller is configured for generating the virtual aircraft interior further based on cabin layout selections.

19. The system of claim 17, further comprising finished interior closeouts configured to secure to the aircraft fuselage in the interior.

20. The system of claim 17, wherein the aircraft fuselage is configured to move between a first position and a second position, wherein a second width of the interior in the second position is larger than a first width of the interior in the first position.

* * * * *